United States Patent
Buck et al.

[11] 3,897,804
[45] Aug. 5, 1975

[54] SWING CHECK VALVE

[75] Inventors: Frank Eugene Buck, Tiburon; Donald E. Graham, San Leandro; Larry A. Battaglia, Benicia; Harry Fred Burger, San Francisco, all of Calif.

[73] Assignee: Valve Systems International, Inc., Bala Cynwyd, Pa.

[22] Filed: June 27, 1973

[21] Appl. No.: 374,085

[52] U.S. Cl............................ 137/527.8; 137/375
[51] Int. Cl.² ........................................ F16K 15/03
[58] Field of Search............. 137/527, 527.2, 527.4, 137/527.6, 527.8, 375, 268; 251/366, 367, 298

[56] References Cited
UNITED STATES PATENTS

| | | | |
|---|---|---|---|
| 846,317 | 3/1907 | Kiddle | 137/527.4 |
| 991,784 | 5/1911 | Kiley | 137/527.4 |
| 2,676,609 | 4/1954 | Pfarrer | 137/375 |
| 3,174,171 | 3/1965 | McDermon | 137/268 X |
| 3,522,929 | 8/1970 | Simone | 251/298 |
| 3,687,155 | 8/1972 | Wheatley | 137/527.8 X |
| 3,720,228 | 3/1973 | Wheatley, Jr. | 137/268 |
| 3,743,246 | 7/1973 | Heller | 251/367 |

*Primary Examiner*—William R. Cline
*Attorney, Agent, or Firm*—Melvin R. Stidham, Esq.

[57] ABSTRACT

The disclosure is of a swing check valve having a spherical body with cylindrical flow passageway hubs welded thereto. A valve seat surrounding the upstream flow passageway is engagable by a valve clapper which itself is a spherical section whereby its center of gravity is located back from the sealing surface around its periphery so that gravity will close the valve, even with the pivotal axis located adjacent the valve seat and within the spherical body. A liner having a frusto-conical inner-surface embraces at least the bottom half of the valve seat and tapers inward to merge with the inner surface of the downstream hub.

6 Claims, 5 Drawing Figures

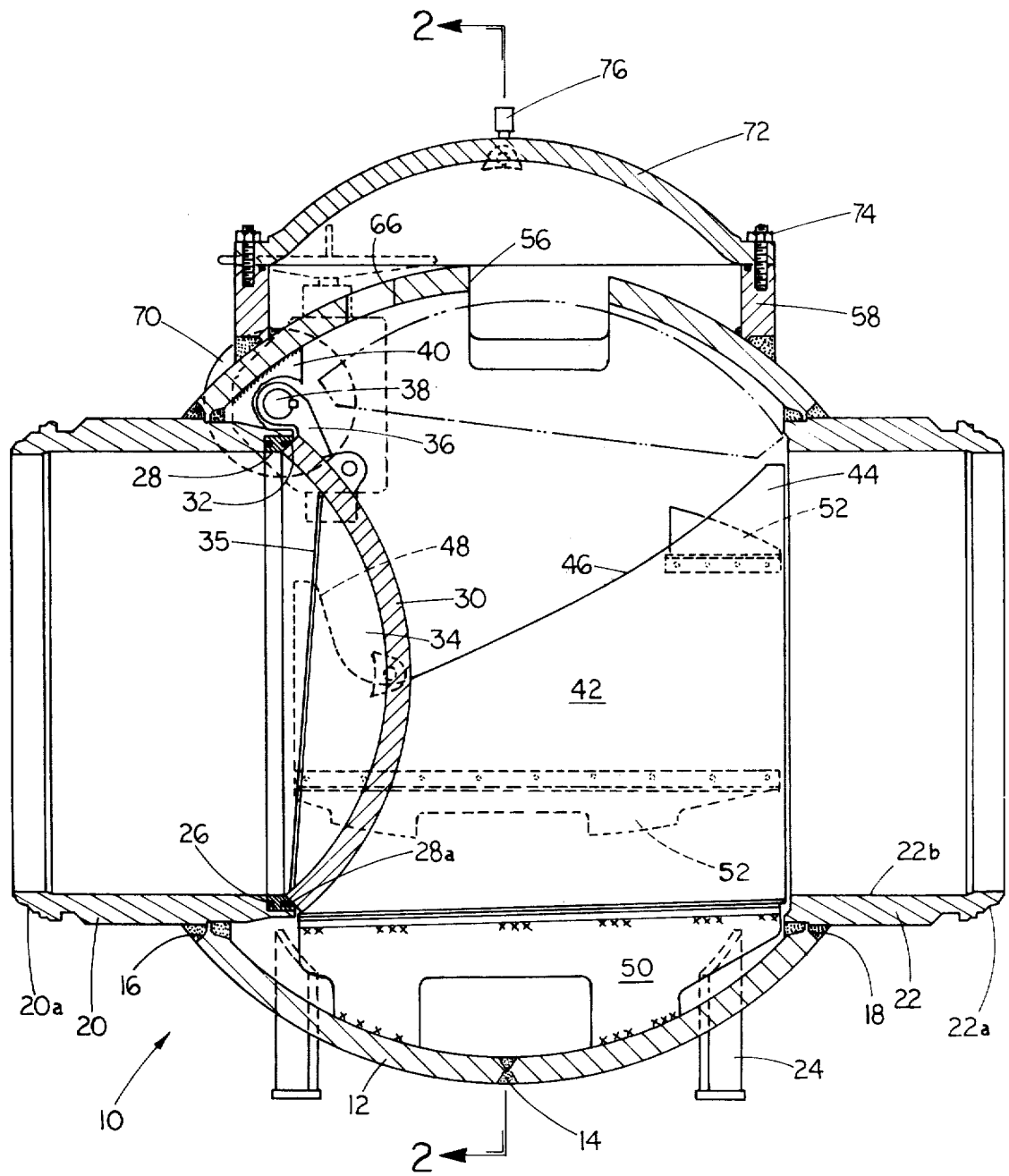
FIG.-1-

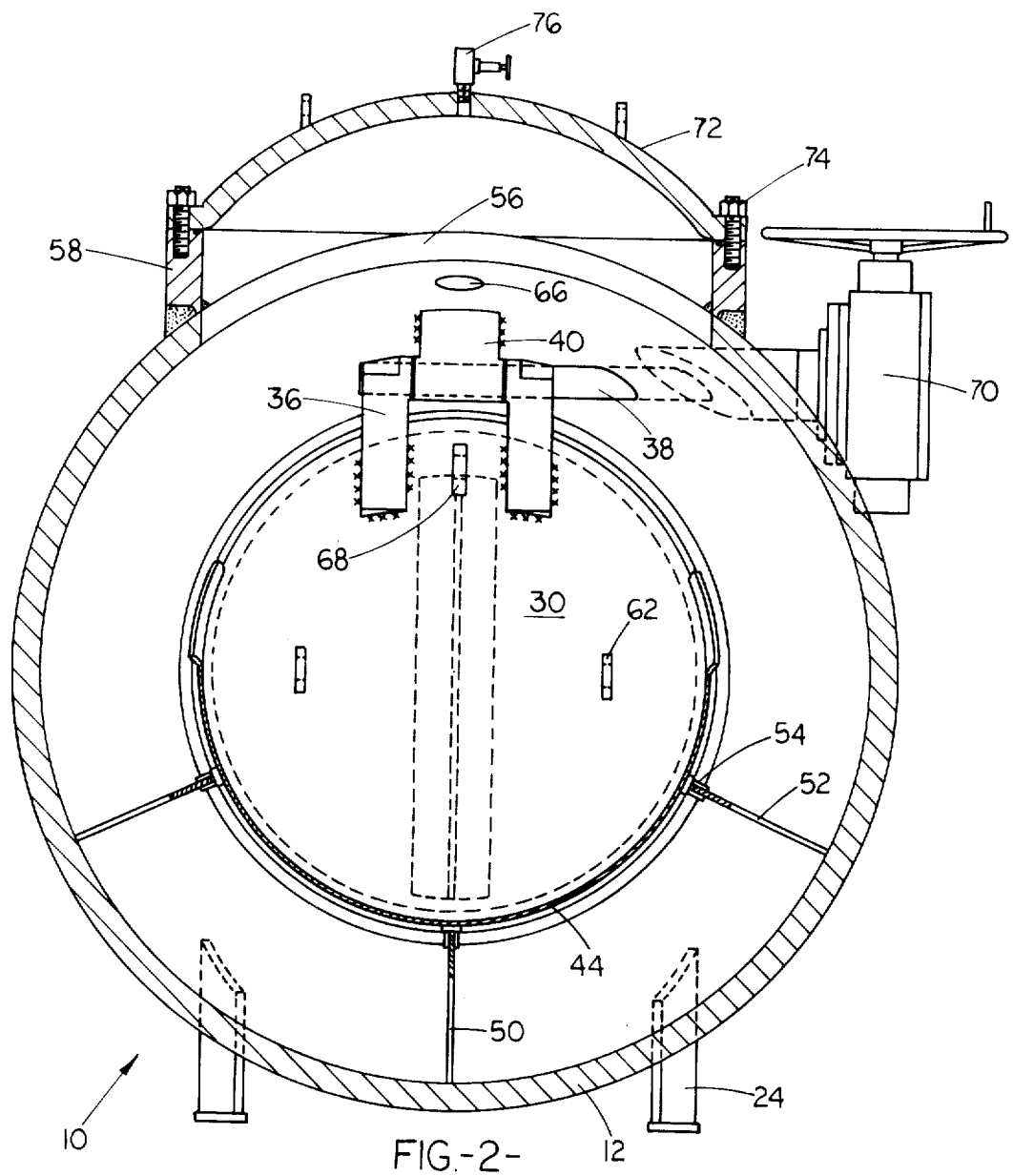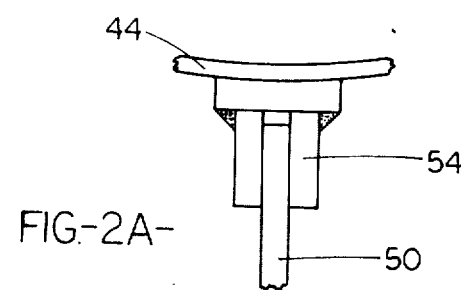

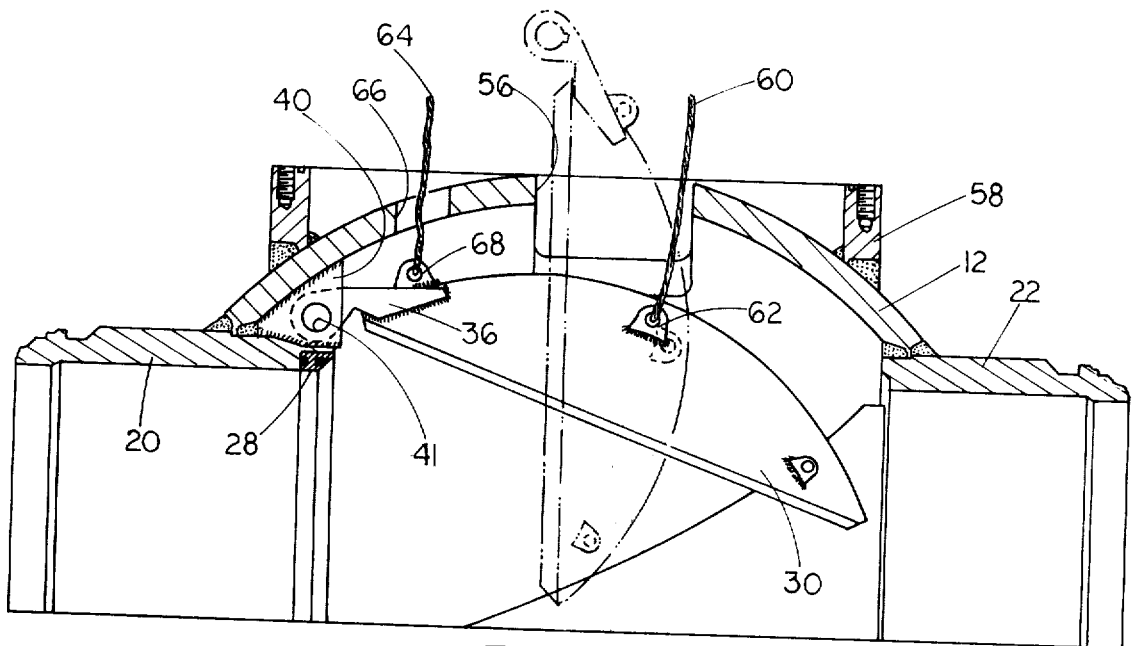
FIG.-3-
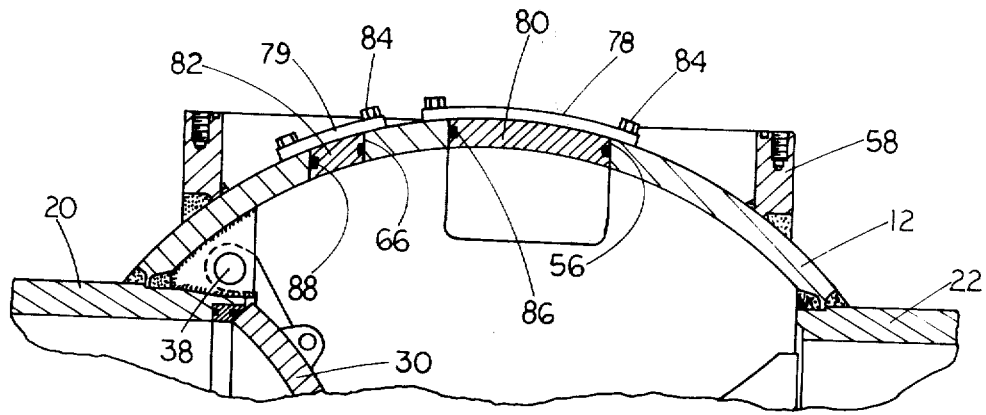
FIG.-4-
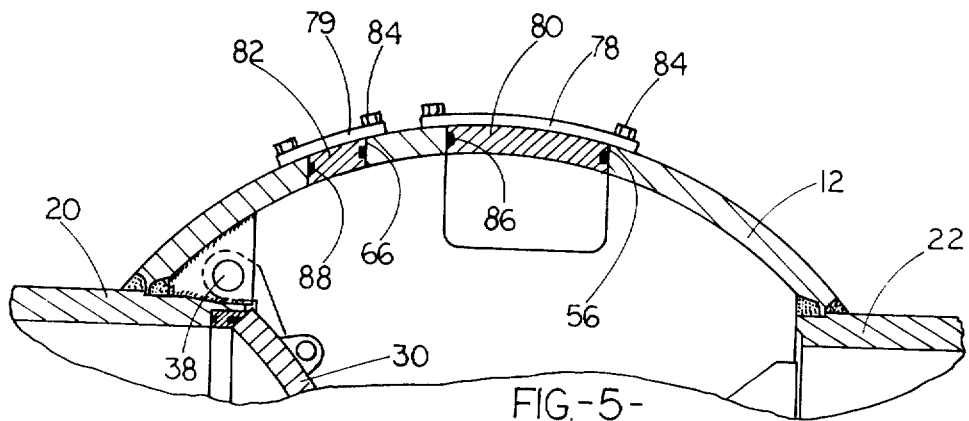
FIG.-5-

SWING CHECK VALVE

BACKGROUND OF THE INVENTION

Swing check valves are commonly employed in large pipelines for the purpose of providing virtually unimpeded flow during normal pipeline operation but to check flow effectively in the event of a reversal thereof. For example, such a valve may be placed at the foot of a hill crossing to check flow and limit escape of the fluid in the event of a line break.

Particularly in the operation of pipelines for the transportation of petroleum products, it is often desirable to transport different fluids over the same pipeline without intermixing the different products. For example, different weights and grades of lubricating oil and both light and heavy fuel oils may be passed through the pipeline at different times. The various products are separated physically by introducing a ball of rubber or the like into the line so as to be forced along by the flowing fluid in sealing engagement with the inner wall of the pipe. In addition, such pipelines are often cleaned by the passage of scrapers of generally spherical or cylindrical configuration.

In a pipeline where a swing check valve is installed, it is imperative that the check member or clapper swing completely free of the flow passage so as not to impede the movement of the product separating sphere or pipeline cleaning device. Accordingly, such valve bodies are normally cast with a top extension forming a chamber into which the clapper may be pivoted. A further body extension is often required to accommodate the pivot mounting for a plate-like clapper, which drops by gravity to engage a planar seat or the body. In order for gravity to act effectively, the pivot axis is displaced from the plane of the seat in the upstream direction.

In order to form a valve body having an upper extension to receive the pivoted clapper and the rearward extension to accommodate the pivotal mounting, it was necessary to form such bodies by casting and often required a substantial departure from optimum design for pressure vessels. In addition, the various housing extensions often formed pockets into which the rubber sphere could expand and become lodged.

OBJECTS OF THE INVENTION

It is an object of the invention to provide a swing check valve having a spherical body section, providing an optimum pressure vessel, with space for accommodating the clapper out of the flow passage.

It is a further object of this invention to provide a swing check valve having a spherical body section which may be fabricated from rolled shapes.

It is a further object of this invention to provide a swing check valve having an enlarged spherical body section, a seat surrounding the upstream flow passage, a clapper engagable with the seat, and a rubber product-separating or line-scraping ball or pig restraining liner partially surrounding the seat and merging with the downstream flow passage.

It is a further object of this invention to provide a swing check valve with a spherical body section and a clapper member so configurated that its center of gravity is displaced from the valve seat when in closed position whereby there is a valve-closing moment arm even with the pivot mounting contained within the sphere.

It is a further object of this invention to provide a swing check valve with a spherical main body with means within the sphere to accommodate the pivoted clapper and the mounting therefore.

Other objects and advantages of this invention will become apparant from the description to follow when read in conjunction with the accompanying drawings.

BRIEF SUMMARY OF THE INVENTION

In carrying out this invention, a spherical main body section may be fabricated from two hemispherical sections which are formed from steel plate or the like and welded together. Cylindrical hubs which adapt the valve for connection into a pipeline are welded into complementary, aligned circular openings in the spherical body. At least one of the cylindrical hubs extends into the interior of the sphere and carries a valve seat thereon for engagement by a complementary sealing surface on a clapper. A clapper of dished, spherical configuration is pivotally mounted about an axis extending transverse to and above the inwardly protruding hub and has its center of gravity displaced from the plane of the seat when in its closed position a sufficient distance to provide a moment arm biasing the clapper into a closed position. A slot is provided in the top of the sphere to permit insertion of the clapper during assembly or disassembly, and the opening is surrounded by a cylindrical, reinforcing body section to which is bolted a dished top closure. A frusto-conical, partial liner surrounds a portion of the valve seat and tapers inward to merge smoothly with the inner surface of the downstream hub to act as a hoop restraining means for a resilient ball passing through the check valve.

BRIEF DESCRIPTION OF THE DRAWINGS

In the drawings:

FIG. 1 is a vertical section view of a swing check valve embodying the features of this invention;

FIG. 2 is a section view taken along line 2—2 of FIG. 1;

FIG. 2A is a partial section view of a liner support mounting;

FIG. 3 is a partial section view showing insertion or removal of the clapper;

FIG. 4 is a partial section view showing the slot plugged; and

FIG. 5 is a partial section view similar to FIG. 4 showing a form of the check valve in which the cylindrical body extension is omitted.

DESCRIPTION OF A PREFERRED EMBODIMENT

Referring now to FIGS. 1 and 2 with greater ticularlity, the swing check valve 10 of this invention includes a spherical main body section 12 which may be fabricated from hemispherical sections, which are formed from steel plates or the like and welded together at 14 along the vertical great circle. The hemispherical sections are formed with upstream and downstream openings 16 and 18 into which upstream and downstream cylindrical hubs 20 and 22 are welded. The hubs shown are finished at their ends 20a and 22a for welding into a pipeline, but it is to be understood that they may be provided with pipeline flanges or any other conventional device for installing the valve 10. Suitable legs 24 may be welded to the spherical section 12 to support the valve erectly, particularly during manufacture and shipping.

As indicated, the upstream hub 20 is slightly longer than the downstream hub 22 and extends into the interior of the spherical main body section 12. An annular recess 26 is formed in the inner end of the upstream hub 20 in order to accommodate a seat ring 28 adapted for sealing engagement with a valve clapper 30. As shown, the clapper is preferably of spherical, dished configuration with a substantially radial edge 32 that engages with a complementary, frusto-conical surface 28a of the seat ring 28. A chordal T-section 34 is welded to the clapper 30 so as to be engagable by a sphere or scraper entering into the upstream hub to cam the clapper into its elevated position shown in phantom in FIG. 1. The chord along which the crossmember 35 of the T-section 34 extends, commences a small arcuate distance from the upper edge of the clapper so as to present a somewhat greater angle of contact with an approaching sphere.

Arms 36 welded to the clapper 30 are keyed to a shaft 38, which, in turn, is rotatably carried in a bearing support member 40 welded to the inner surface of the main spherical body section 12. The axis of the shaft 38 is located above and slightly upstream of the valve seat sealing surface 28a and, in addition, the spherical, dished configuration of the clapper disposes its center of gravity downstream of the valve seat sealing surface a sufficient distance to present a moment arm about the axis of the shaft 38 causing gravity to bias the clapper more firmly into closed position as shown.

Closely adjacent to and partially surrounding the valve seat, so as to partially embrace the valve clapper in closed position, is a partial sleeve liner 42 which tapers inward in frusto-conical configuration to merge with and form a continuation of the inner surface 22b of the downstream hub 22. As shown, the liner at the downstream end 44 is nearly a complete cylinder but is cut away at 46 to accommodate the clapper as it moves into its full open position shown in phantom. Then, as it embraces the valve seat it is again extended around at 48 to more than 180° of the valve seat circumference.

Referring particularly to FIG. 2, web supports 50 and 52 for the liner 44 are first welded into the spherical body section 12. Liner positioning pads 54 (FIG. 2A) carried on the ends of the supports provide a bearing surface for the liner. The liner 44 is preferably fdormed in two or three sections each of which is inserted in place and raial adjustments made as necessary with the positioning pads 54, until the liner is centered. Then the assembly is tack welded into place and the sections of the liner welded together to form a complet unit.

Referring now to FIG. 3, the method of installing or removing the clapper 30 is shown. A slot 56 of a size and configuration sufficient to permit entry of the valve clapper is out into the top of the spherical section and is disposed so that the vertical center line of the spherical section coincides with the plane along which the maximum circumference of the clapper moves during such passage. This minimizes the amount of metal that must be removed to form the slot-passageway and also reduces the size of the area which must be reinforced by the vertical cylindrical body extension 58.

In placement of the valve clapper 30 it is suspended by engagement of a cable 60 or the like through an eye 62 welded onto the back of the clapper 30 and lowered along the path shown in phantom in FIG. 3 until it is entirely contained within the spherical section 12. Then a second cable 64 is attached through a secondary opening 66 to another eye 68 carried on the clapper 30 and the clapper is pivoted and moved over into alignment with the bearing opening 41 in the bearing support member 40. In this position, the shaft 38 (FIG. 1) is inserted and keyed to the clapper. Thereafter, the shaft 38 is connected to any suitable operating device 70 capable of moving it to the full open position as shown in phantom in FIG. 1 or to allow it to swing free to function as a check valve.

In completing the assembly of the valve a top closure 72 is bolted at 74 to the vertical cylindrical body section 58 and may be fitted with a relief or exhaust valve 76.

Referring now to FIG. 4, the spherical body section 12 may be further reinforced by plugging the slot 56 and the opening 66. This can be accomplished by welding brackets 78 and 79 to the pieces 80 and 88 which were previously cut from the spherical section 12 to form the slotted opening. The plugs 80 and 82 are in the openings and bolted in place at 84 so that the spherical section is continuous. In addition, the plugs 80 and 82 may be sealed as by means of O-rings 86 and 88 so that the spherical section embraced by the cylindrical bonnet 58 functions not merely as a strengthening beam, but as a spherical membrane. If in such case, the space within the vertical section 58 is maintained at atmospheric pressure, as by exhausting through valve 76 (FIG. 1), the sphere is further stiffened.

As shown in FIG. 5, the cylindrical body extension and to closure (58 and 72 in FIG. 1) may be omitted when the plugs 80 and 82 are sealed with the spherical body section 112, as by means of the O-ring 86 and 88.

While this invention has been described in conjunction with a preferred embodiment thereof, it is obvious that modifications and changes therein may be made by those skilled in the art without departing from the spirit and scope of this invention.

What is claimed as invention is:

1. A swing check valve comprising:
    a housing with upstream and downstream flow passageways of circular cross-section; and
    an enlarged, spherical central body section intermediate said flow passageways;
    a valve seat in the housing surrounding said upstream flow passageway;
    a valve clapper having a generally circular sealing surface;
    a pivot mounting on said housing supporting said clapper for movement between a closed position with said sealing surface engaging said valve seat and an open position at an angle thereto; and
    a generally cylindrical liner centered in said central section extending between and coaxial with said flow passageways;
    said liner being substantially of the diameter of said downstream flow passage closely adjacent thereto and merging therewith over most of the curcumference thereof but embracing said valve seat around a major portion thereof opposite said pivot mounting, just enough of said liner intermediate the ends thereof being removed to accommodate said valve clapper in open position.

2. The swing check valve defined by claim 1 wherein: said pivot mounting connection with said clapper is disposed entirely within said spherical section with the pivotal axis thereof generally horizontal; and the center of gravity of said valve clapper is displaced downstream from the plane of said sealing surface so as to bias said clapper about said pivotal axis firmly against said valve seat when in closed position.

3. The swing check valve defined by claim 2 wherein: said valve clapper is of spherical concave configuration opposing said valve seat.

4. The swing check valve defined by claim 3 including:
a slot in said spherical section of a length and width to enable passage of said valve clapper therethrough when released from said pivot mounting;
said slot being disposed so that passage of said clapper valve occurs with the major diamter thereof moving along a great circle of said sphere; and
a cylindrical reinforcing bonnet welded to said spherical section around said slot.

5. The swing check valve defined by claim 4 including:
a dished, spherical section cover secured on said bonnet.

6. A valve structure comprising:
a housing with upstream and downstream flow passageways of generally circular cross-section; and
a spherical central body section intermediate said flow passageways;
a valve seat in the housing surround said upstream flow passageway;
a valve member mounted in said housing for movement into and out of sealing engagement with said valve seat;
a slot in said central body section of a length and width to permit installation of said valve member therethrough;
a closure in said slot secured to said central section;
seal means sealing around said closure to render said central section fluid tight;
a cylindrical reinforcing bonnet welded to said spherical section around said slot;
a cover secured on and sealed around said bonnet; and
means for evacuating the space below said cover.

* * * * *